(No Model.)
C. E. SACKETT.
COMBINED PLOW AND PULVERIZER.
No. 268,830. Patented Dec. 12, 1882.
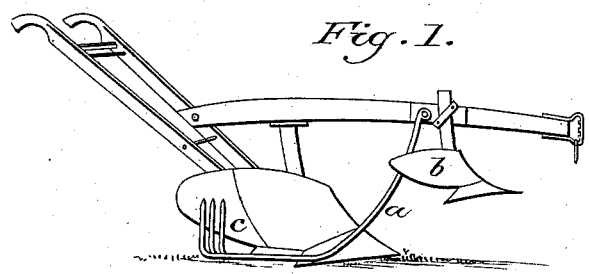
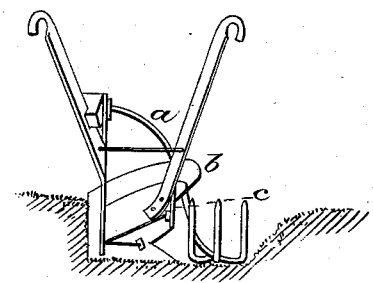
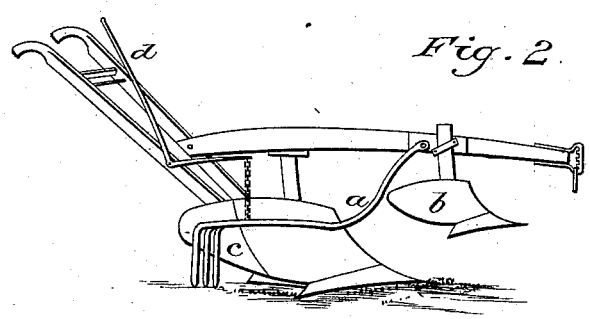
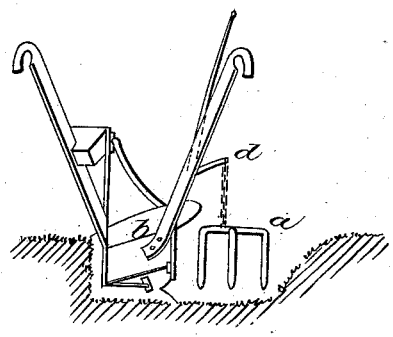
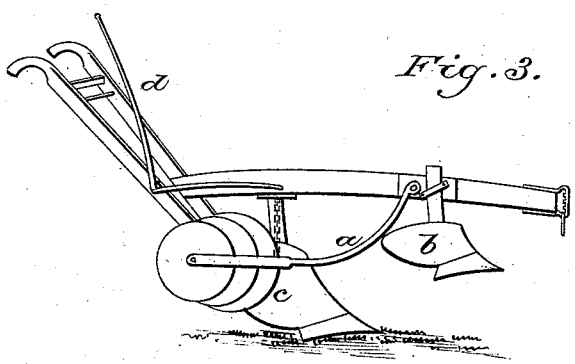
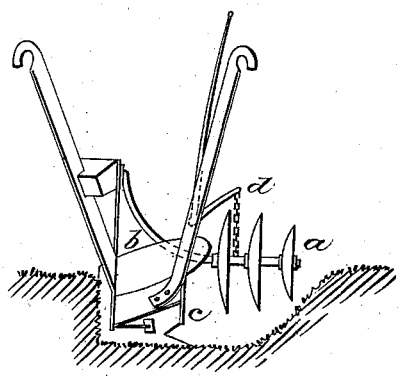
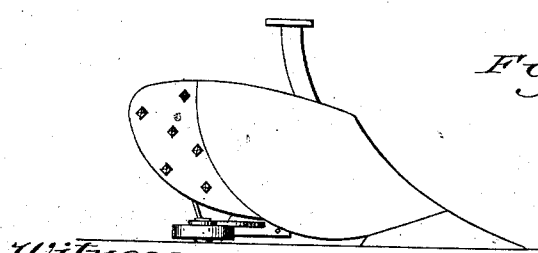
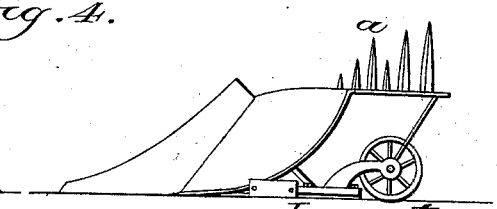
Witnesses:
Geo. A. Byley
David Kirk
Inventor:
Chas. E. Sackett

UNITED STATES PATENT OFFICE.

CHARLES E. SACKETT, OF MORRISTOWN, NEW JERSEY.

COMBINED PLOW AND PULVERIZER.

SPECIFICATION forming part of Letters Patent No. 268,830, dated December 12, 1882.

Application filed April 6, 1882. (No model.)

*To all whom it may concern:*

Be it known that I, CHARLES E. SACKETT, of Morristown, Morris county, and State of New Jersey, have invented a new and useful Improvement in Combined Plow and Pulverizer, of which the following is a specification.

My invention relates to the combination of a pulverizing device with a plow for the better pulverization of the earth as turned by the plow, and in one and the same operation.

It consists in the use of a forward skim-plow and weed-turning device, in connection with independent teeth or cutting-blades dragged in the furrow made by a rear or subsoil plow, which raises a further cut of earth and turns it over upon the teeth, dragging in the furrow for the better pulverization of the same; and it consists, further, in combining with the pulverizing devices a mold-board adapted to confine the earth in the furrow for the purpose of being pulverized.

Figure 1 shows in side and rear elevation such a combined device, the teeth being upturned from a drag-bar in the bottom of the furrow. Fig. 2 shows a similar view with the teeth projecting downward from a drag on top of the soil. Fig. 3 shows a similar view, disk-cutting blades being used to pulverize the earth in place of teeth. Fig. 4 shows a side elevation and plan view of a plow mold-board with a flattened extremity, for the purpose hereinafter set forth.

In Fig. 1 a bar, *a*, is shown pivoted to the plow-beam, and provided at its extremity with upturned teeth or cutting-blades, and dragging in the furrow last made. The earth, as turned by the plow, falls upon the bar, and as the teeth or blades are dragged through the earth they act like harrow-teeth to complete its pulverization. As the sod, weeds, roots, &c., usually encountered in plowing would most likely clog the teeth if turned by the plow in mass directly before them, I use a forward plow, *b*, or a device for a similar purpose, to skim them off and turn them into the furrow just before the pivoted bar carrying the teeth, thus causing it to always pass over the sod or other débris turned into the furrow, and leaving the teeth or blades to act only upon the cleared earth turned by the rear plow before them. The forward skimming device may be made vertically adjustable, so as to skim any desired thickness of débris and leave any desired or practical thickness to be pulverized by the teeth. The extremity of the mold-board *c* of the rear plow is flattened and made parallel with the land-side, so as to confine the earth in the furrow to be operated upon by the teeth.

In Fig. 2 the same principles and description apply, excepting that the teeth or blades are turned down, as is usual in harrowing. The teeth or blades may be of any well-known or convenient form. An angle-lever, *d*, with a chain or connection at its extremity, may be pivoted at any convenient point for supporting or lowering the teeth to any desirable depth of penetration.

In Fig. 3 the same principles and description apply as in Fig. 2, excepting that disk cutting-blades are used, the invention in this figure relating only to the combination of disk cutting-blades with a plow in the operation of plowing.

In Fig. 4 the teeth or blades are attached directly to the plow mold-board, and a wheel may be used for a landside to overcome the friction and maintain the parallel movement of the plow with the furrow.

What I claim is—

1. In a plow, the combination of pulverizing devices operating in the furrow beside the plow with a forward plow or similar device to remove the sod or weeds and turn them below or out of the way of the pulverizing devices, substantially as set forth.

2. In a plow, the mold-board having a flat extremity, substantially parallel with the furrow, for the purpose of confining the earth in the furrow, in combination with pulverizing devices, substantially as described and shown.

3. The combination, with a plow, of the pivoted bar carrying upturned teeth and adapted to drag in the furrow last made, whereby the teeth operate below and up through the soil turned upon them by the plow, as set forth.

4. In combination with a plow, upturned teeth or points attached to a drag adapted to operate in the furrow last made, for the purpose of pulverizing the earth turned upon them by the plow, said teeth being adapted to move vertically independent of the plow, and to be dragged—not rotated—in the furrow, as set forth.

In testimony whereof I have signed my name to this specification in the presence of two subscribing witnesses.

CHAS. E. SACKETT.

Witnesses:
 JAMES P. WILSON,
 J. LOUIS SEARING.